United States Patent [19]
Bacchi et al.

[11] Patent Number: 5,777,743
[45] Date of Patent: Jul. 7, 1998

[54] SCRIBE MARK READER

[75] Inventors: Paul E. Bacchi, Novato; Paul S. Filipski, Greenbrae, both of Calif.

[73] Assignee: Kensington Laboratories, Inc., Richmond, Calif.

[21] Appl. No.: 726,847

[22] Filed: Oct. 3, 1996

Related U.S. Application Data

[63] Continuation of Ser. No. 261,440, Jun. 17, 1994, abandoned.

[51] Int. Cl.$^6$ .................................................... G06K 7/10
[52] U.S. Cl. .......................... 356/370; 356/446; 235/462; 235/455
[58] Field of Search .............................. 356/370, 369, 356/364, 396, 371, 237, 445, 446; 250/225, 566; 235/462, 467, 470

[56] References Cited

U.S. PATENT DOCUMENTS

| | | | |
|---|---|---|---|
| 3,812,374 | 5/1974 | Tuhro | 356/446 |
| 4,019,026 | 4/1977 | Nakanishi et al. | 235/467 |
| 4,586,780 | 5/1986 | Chern et al. | |
| 4,818,847 | 4/1989 | Hara et al. | 235/455 |
| 5,149,948 | 9/1992 | Chisholm | 235/462 |
| 5,177,346 | 1/1993 | Chisholm | 235/470 |
| 5,231,536 | 7/1993 | Wilt et al. | 359/436 |
| 5,239,169 | 8/1993 | Thomas | 235/462 |
| 5,371,347 | 12/1994 | Plesko | 235/470 |
| 5,406,060 | 4/1995 | Gitin | 235/462 |
| 5,449,892 | 9/1995 | Yamada | 235/472 |
| 5,585,615 | 12/1996 | Iwanami et al. | 235/472 |

FOREIGN PATENT DOCUMENTS

| | | |
|---|---|---|
| 3736288 | 5/1989 | Germany. |
| 3829069 | 3/1990 | Germany. |
| WO/9110968 | 7/1991 | WIPO. |

*Primary Examiner*—Hoa Q. Pham
*Attorney, Agent, or Firm*—Stoel Rives LLP

[57] ABSTRACT

A scribe mark reader (10) uses a source of circularly polarized light and a holographic beam-shaping optical element (40) to uniformly illuminate an area of a substrate (20) that includes a scribe mark (18). Light incident on the substrate at a scribe mark is predominantly scattered, whereas light incident on the substrate at a processed area (30) of the wafer surface between the pits (28) of the scribe mark is predominantly specularly reflected. The phase-reversed, specularly reflected light from the processed area is blocked by a circular analyzer that passes light scattered from the scribe mark. Light passing the polarizer can then be used to form an image of the scribe mark. The intensity of the images formed are sufficiently consistent that the automatic gain control of the CCD camera can be used and the images formed can be readily interpreted by optical character recognition software.

9 Claims, 5 Drawing Sheets

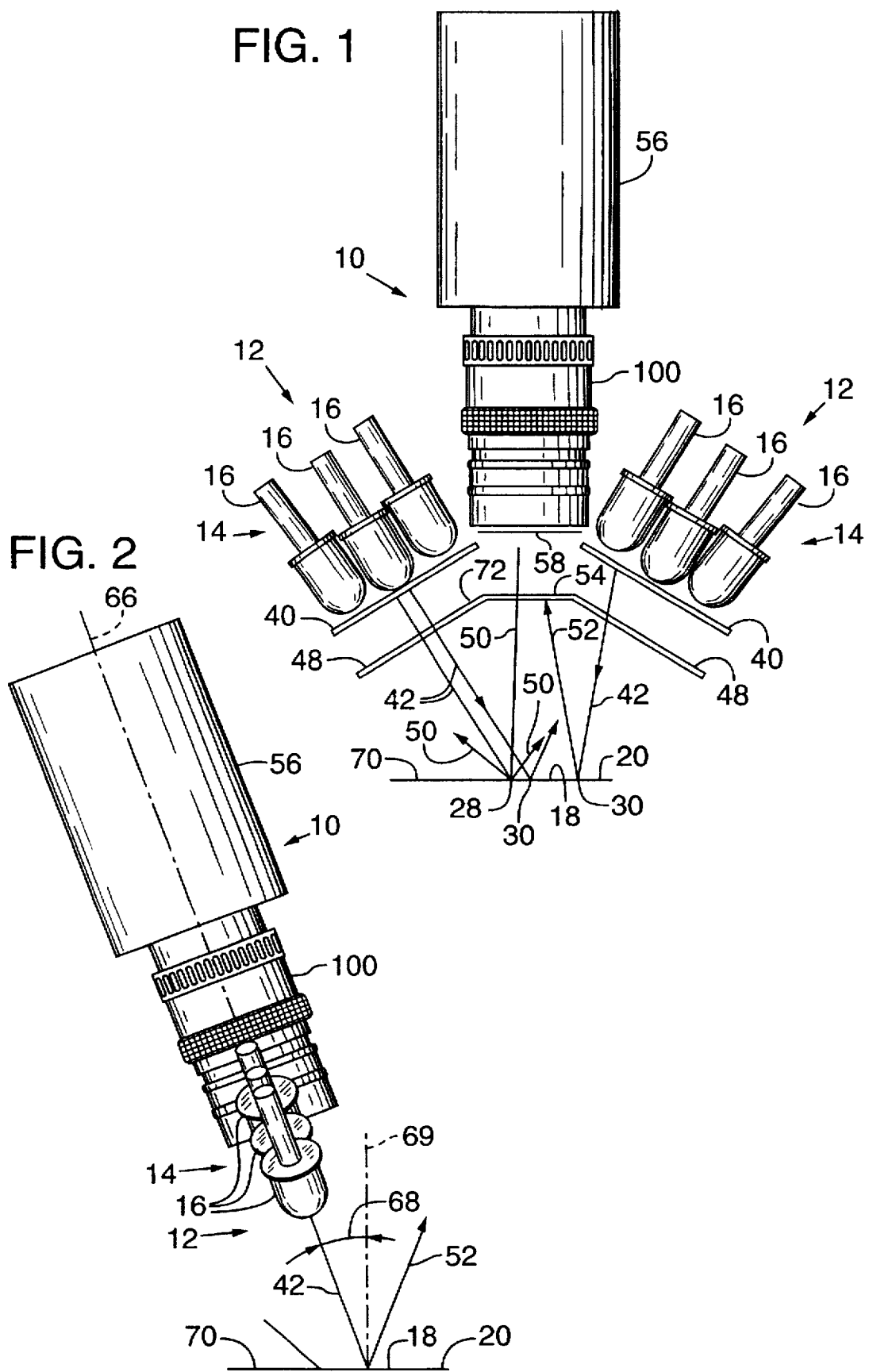

SCRIBE MARK READER

This is a continuation of application Ser. No. 08/261,440, filed June 17, 1994 now abandoned

TECHINCAL FIELD

This invention relates to illuminating and forming a light pattern of an identifying mark on a substrate and, in particular, to illuminating and imaging scribe marks on a semiconductor wafer.

BACKGROUND OF THE INVENTION

Semiconductor wafers used in the manufacture of integrated circuits are often marked with identifying information to facilitate in-process tracking during their production. The identifying marks, known as scribe marks, typically comprise a series of characters, bar codes, or other two-dimensional codes, each of which is formed from small circular depressions or "pits" in the substrate. The pits are typically formed by using a laser to melt a small area of the substrate, the melted material being removed in subsequent etching steps. Because integrated circuits should not be formed on the scribe marks, they are typically positioned near the unused outer edge of the wafer by the primary fiducial to maximize the wafer surface area available for forming integrated circuits.

Using a human operator to manually read the marks directly from the wafers is labor intensive and susceptible to error. Moreover, the marks are not always accessible to the operator during wafer processing. Using an imaging system that presents an enlarged image of the mark to the operator increases the accuracy of the observation, but the process is still labor intensive and susceptible to error because of poor image quality. Efficient wafer fabrication requires that the marks be reliably machine-readable by automated process equipment. Some marks, such as bar codes, are readable essentially only by a machine.

Automated reading of a mark is a three-step process. A camera typically forms an image of the scribe mark, and the image is converted into a computer-compatible digital format. The digitized image is then interpreted, for example, by optical character recognition software to determine letters, numbers, bar codes, or other symbols in the digitized image. For the mark to be interpreted by the software, the digitized image must be relatively clear, i.e., there must be adequate contrast between the background and the image of the mark.

It has been difficult to form a clear image of the scribe marks for several reasons. Because typical scribe marks comprise a group of relatively shallow depressions in the substrate, the marks are of the same color as the substrate background and are, therefore, hard to differentiate. The pits of shallow or "soft" marks, which are used to reduce contamination during wafer processing, can have a depth of only one micron. Moreover, the substrates are typically highly polished and, therefore, reflect into the camera a large amount of light that tends to obscure the mark. Light from the processed areas on the water surface around the pits of the scribe mark is process "noise" that tends to obscure the light "signal" from the scribe mark.

During wafer fabrication, layers are formed on the wafers using a variety of materials having a wide range of reflectivity and other optical properties. Illumination levels required to achieve an image having adequate contrast between the background and the mark can vary over three orders of magnitude, thereby requiring frequent gain adjustments to the charge-coupled device ("CCD") camera. The automatic gain control on CCD cameras reacts too slowly to such a wide range of brightnesses and, if used, unacceptably delays processing. Manual gain adjustments or sequenced changes in the illumination level can be used to compensate for the variation in image intensity, but such methods also slow production. Moreover, manual adjustments require an operator to continuously monitor the scribe mark reader.

The optical properties of the wafer surfaces vary not only from wafer to wafer but also across the surface of an individual wafer. Wafers can exhibit an "edge bead", i.e., an abrupt change in contrast and reflectivity of the surface as a result of a layer, such as a metal or oxide coating, not extending to the outer periphery of the wafer. The edge bead can appear across the scribe mark itself, producing artifacts in an image formed of the mark. Imperfect forming or etching of the layers can also cause thickness variations in the layers, especially at the edges of the wafers where the thickness variations are observable as annular rings. The coloration and nonuniform reflectivity of such rings, located at the edge of the wafer where the scribe marks are also located, interfere with reading the scribe marks by producing artifacts in the image. Furthermore, materials used to treat or coat wafers, particularly photoresist, can accumulate in the depressions of the scribe marks, further obscuring the mark by affecting the optical properties of the substrate surface and scribe marks.

Because the problems described above make it difficult to form a clear image of the scribe marks, the optical character recognition software often cannot interpret the poor quality image it receives. Scribe mark readers typically require, therefore, frequent intervention from human operators, either to adjust the optical elements to improve the image or to manually read the mark or significant investment by semiconductor manufacturers to improve or add additional process steps to improve the scribe readability.

SUMMARY OF THE INVENTION

An object of the present invention is, therefore, to provide an apparatus and a method for forming a light pattern representing a mark on a substrate.

Another object of this invention is to provide an apparatus and a method for illuminating a mark on a substrate with light having a spatial intensity distribution essentially free of significant local nonuniformities.

A further object of this invention is to provide such a method and apparatus that can form a light pattern capable of being interpreted by optical character recognition software with a minimum amount of human intervention and number of errors.

The present invention is a method and an apparatus for illuminating and forming an image of marks on a surface and forming an easily interpreted light pattern representative of the mark. The method and apparatus are particularly adapted to illuminating and imaging scribe marks on a semiconductor wafer surface.

A portion of a substrate that includes a scribe mark is uniformly illuminated, for example, by using a light source that includes a beam-shaping optical element positioned between a solid-state light emitter and the substrate. The beam-shaping optical element typically forms light from one or more emitters into a circularly or elliptically shaped beam having a spatial intensity essentially free of significant local nonuniformities. Depending on the configuration of the system, light from the emitter is reflected by or transmitted through the beam-shaping optical element toward the substrate.

Much of the light incident upon the processed areas of the substrate, i.e., areas of the substrate other than the pits that comprise the scribe mark, is specularly reflected. Light incident upon the pits comprising the scribe marks is primarily scattered. It is possible to preferentially attenuate light propagating from the scribe mark or light propagating from the processed area of the substrate around the scribe mark by using the different polarization characteristics of the scattered and reflected light components. Either of these light components can be used to form a relatively high contrast light pattern representative of the scribe mark, with process contributions from the other component reduced. The light pattern is then detected and interpreted.

In one preferred embodiment, a portion of the substrate that includes a scribe mark is uniformly illuminated using a holographic optical element ("HOE") beam-shaping diffuser and circularly polarized light. Light propagating from the substrate passes through a circular polarizer to attenuate specularly reflected light, i.e., light that is not from the scribe mark. Light scattered from the scribe mark passes through the circular polarizer with less attenuation to form a light pattern representative of the scribe mark that is detected, typically in an imaging system using a CCD camera. A field stop is typically used to further reduce background light entering the camera.

The light pattern formed, therefore, consists primarily of light scattered by the scribe mark, with a minimum of process noise from other areas of the substrate. The range of light intensities of the images thus formed is sufficiently narrow to allow effective use of the automatic gain control of the camera. The high contrast between the image of the scribe mark and the background produces a consistently machine-readable image without frequent manual adjustments.

In a second preferred embodiment, a portion of the substrate that includes a scribe mark is uniformly illuminated using a reflection mode HOE beam-shaping diffuser. Light reflected from areas of the substrate around the scribe mark is specularly reflected into the CCD camera, whereas light scattered from the scribe mark is scattered away from the camera. An image of the scribe mark is formed, therefore, as dark dots against a bright background.

Additional objects and advantages of the present invention will be apparent from the following detailed description of preferred embodiments thereof, which proceeds with reference to the accompanying drawings.

BRIEF DESCRIPTION OF THE DRAWINGS

FIG. 1 is a schematic representation of a preferred embodiment of a scribe mark reader incorporating the present invention.

FIG. 2 is a side elevation view of the scribe mark reader of FIG. 1.

DETAILED DESCRIPTION OF PREFERRED EMBODIMENTS

Figure 3:
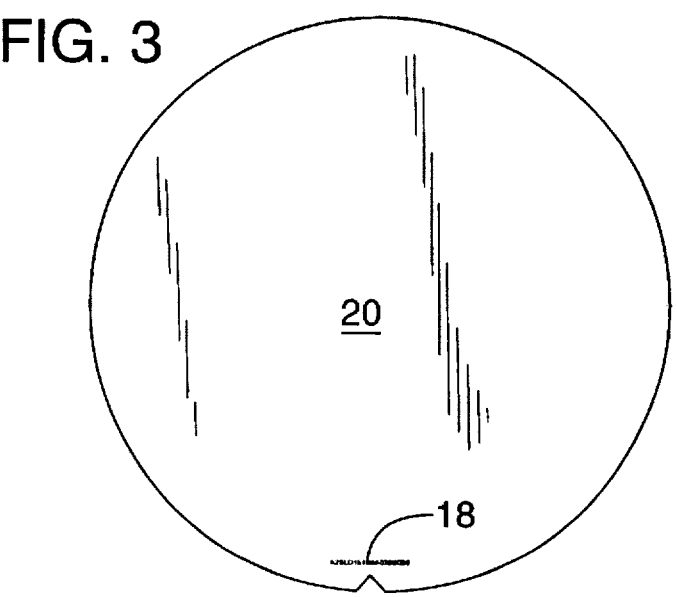
FIG. 3 is a plan view of the substrate of FIG. 1, showing a typical scribe mark.
Figure 4:
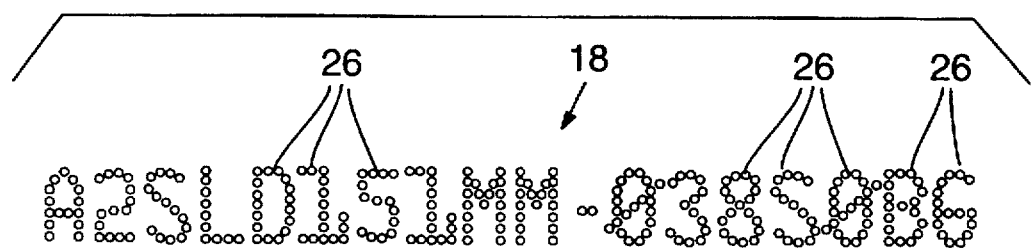
FIG. 4 is an enlarged view of the scribe mark shown of FIG. 3.
Figure 5:
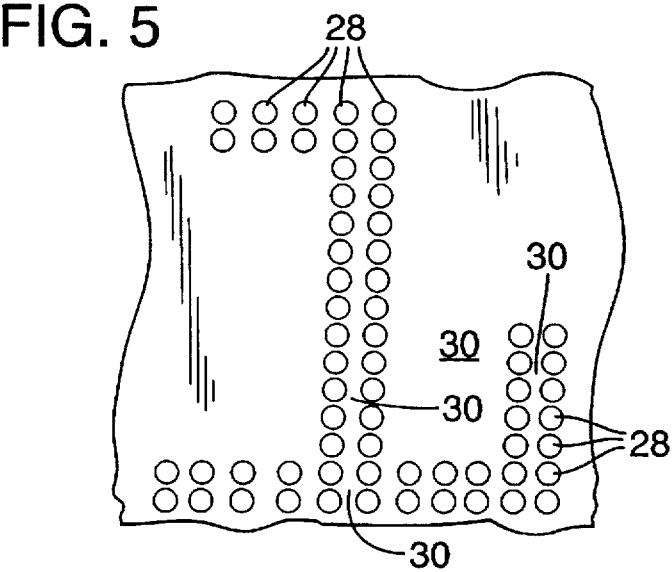
FIG. 5 shows a further enlarged single character of the scribe mark of FIG. 4.

FIGS. 1 and 2 show a first preferred embodiment of a scribe mark reader 10 of the present invention. A light source 12 comprising two banks 14 of multiple lamps 16 emits light to illuminate a scribe mark 18 on a substrate 20, such as a semiconductor wafer upon which integrated circuits are in the process of being fabricated. FIG. 3 shows a plan view of a typical scribe mark 18 on substrate 20; FIG. 4, which is an enlarged view of the scribe mark 18 of FIG. 3, shows that a typical scribe mark consists of a series of characters 26; and FIG. 5 shows that typical characters 26 consist of pits 28 surrounded by relatively flat, processed areas 30 of substrate 20.

Light from each bank 14 (FIGS. 1 and 2) passes through a beam-shaping optical element 40, such as a refractive, diffractive, reflective, or hybrid micro-lens array. A preferred beam-shaping element comprises a holographic optical element ("HOE") such as a light-shaping diffuser composed of multiple micro-lenses (not shown). The micro-lenses of each HOE diffuser combine and shape the light from the multiple lamps 16 of each bank 14 into a single beam of light having a spatial intensity distribution essentially free of significant local nonuniformities and preferably having an elliptical cross-section to conform somewhat to the shape of the series of characters 26 of scribe mark 18.

Figure 6:
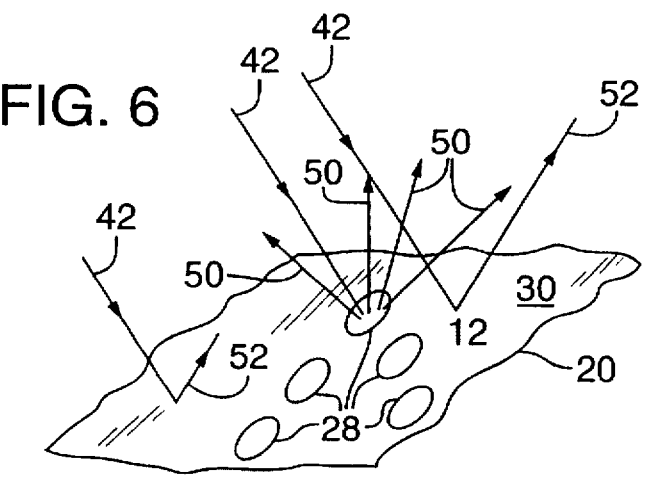
FIG. 6 shows light incident on a portion of the substrate that includes a pit and a processed area.

Individual rays of light 42 of the shaped beam pass through a circular polarizer 48 before striking a portion of substrate 20 that includes mark 18. FIG. 6 shows that light 42 incident on substrate 20 at a pit 28 is primarily scattered as scattered light 50. Light 42 incident on substrate 20 at positions other than a pit 28, i.e., processed area 30, is primarily specularly reflected as reflected light 52. Upon specular reflection, the direction or "handedness" of the circular polarization of reflected light 52 is reversed compared to that of incident light beam 42 and scattered light 50.

Scattered light 50 and reflected light 52 propagate from substrate 20 and are incident on a circular polarizer 54 (FIG. 1). Reflected light 52 is attenuated by polarizer 54 because the direction of polarization of reflected light 52 is reversed from that of light beam 42. Scattered light 50, which has different polarization characteristics from those of reflected light 52, is transmitted through polarizer 54 with significantly less attenuation than that of reflected light 52. Polarizer 54 thus is used to preferentially attenuate light reflected by processed area 30 relative to light scattered by pits 28 of scribe mark 18.

Figure 7:
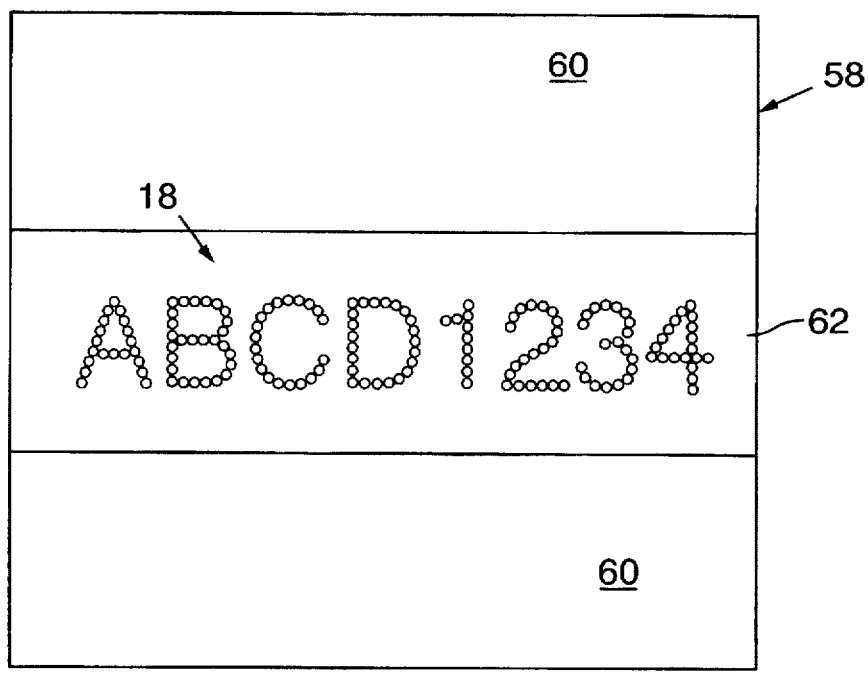
FIG. 7 is a diagram showing the spatial relationship between the image of a scribe mark and a field stop masking a part of the CCD camera.

A detector, such as a CCD camera 56, is positioned to receive light passing through polarizer 54. A field stop 58 (FIGS. 1 and 7) positioned between polarizer 54 and CCD camera 56 has opaque portions 60 that further reduce background light entering camera 56 while providing a window 62 through which light from scribe mark 18 can pass. Opaque portions 60 typically mask approximately the upper and lower thirds of the field of view of camera 56, leaving a field of view just sufficient to form an image of scribe mark 18. Field stop 58 is not in the focal plane of the camera 56, so camera 56 does not form a sharp image of the field stop that could be misinterpreted as part of scribe mark 18. Camera 56 thus forms a light pattern representative of scribe mark 18 from light that includes a minimum of extraneous light, or process noise, from processed areas 30 of substrate 20.

Because the image of the scribe mark 18 appears as a bright field against a relatively dark background, and because field stop 58 and polarizer 54 greatly decrease the range of light intensity in the dark background, the automatic gain control of camera 56 can be efficiently used. The set point for differentiating between a background and a foreground pixel changes significantly less than in prior art scribe mark readers allowing the automatic gain control to enhance the entire image. The increased consistency in light levels also allows the integrator bandwidth to be increased, thereby reducing processing time.

The light pattern or image of scribe mark 18 formed by the present invention is, therefore, clearer and more easily interpreted by optical character recognition software or by a person observing the displayed image on a video screen. Use of the automatic gain control of camera 56 eliminates the need for manual adjustment to the camera gain or the intensity of the illumination. It will be understood that the light pattern need not be displayed as an observable image but can be detected and analyzed electronically as a collection of data points.

The components of reader 10 are positioned close together to create a compact package for the convenience of mounting onto a wafer processing system. Reader 10 is positioned as close to scribe mark 18 as possible to reduce the required light intensity of light source 12. In one embodiment, reader 10 is mounted approximately four inches from substrate 20 and polarizer 48 is mounted in contact with beam-shaping optical element 40. The exact dimensions of the system are not considered to be critical, and the dimensions for any particular configuration can easily be determined.

Preferred lamps 16 of light source 12 provide high intensity illumination of scribe mark 18 while consuming minimal power. Suitable lamps include untinted, nondiffused, solid-state lamps that use a highly optimized light-emitting diode ("LED") material, such as aluminum gallium arsenide, incandescent lamps, and lasers. Such lamps provide excellent light output efficiency over a range of electrical currents and exhibit superior current handling capability. For example, one commercially available lamp has a 4° viewing angle and provides an on-axis luminous intensity value of approximately 36 candelas.

Each bank 14 of lamps 16 includes three lamps 16. Banks 14 are positioned symmetrically, one on each side of camera 56, in a single plane 66 (FIG. 2) that also includes camera 56. Banks 14 are also positioned as nearly as possible and symmetrically with respect to scribe mark 18. Plane 66 is preferably oriented at an angle 68 to a plane 69 normal to a top surface 70 of substrate 20 to specularly reflect much of light 52 away from polarizer 54 and camera 56. Such an orientation is preferred because polarizer 54 does not completely block all incident light propagating from processed area 30.

The present inventors have found that the difficulty in forming a clear image of a scribe mark on a surface of nonuniform reflectivity is exacerbated by a lack of spatial uniformity in the intensity of the light illuminating the mark. A bright light source is required to provide sufficient light to form a useful image. Bright light sources, however, have "hot spots", i.e., very bright areas in the field of illumination that cause the image of the scribe mark to asymmetrically characterize the mark, thereby making the image more difficult to interpret. Although conventional diffusers can remove second order nonuniformities in the light source, they are incapable of removing first order hot spots.

Lamps 16, although sufficiently bright, typically provide unacceptably nonuniform illumination across scribe mark 18 due to local nonuniformities, such as hot spots. Such nonuniform illumination can produce artifacts in the image of scribe mark 18 formed by camera 56. Beam-shaping optical element diffusers 40 positioned between lamps 16 and substrate 20 transform the nonuniform illumination of lamps 16 into a shaped, light beam 42 having a spatial intensity distribution essentially free of significant local nonuniformities. Significant local nonuniformities are relatively abrupt changes in light intensity over a spatial scale comparable to that of the scribe marks and of a magnitude comparable to the difference in intensity of the scribe mark image and the background light. Significant local nonuniformities interfere with the ability of the reader to interpret the scribe marks.

Figure 8:
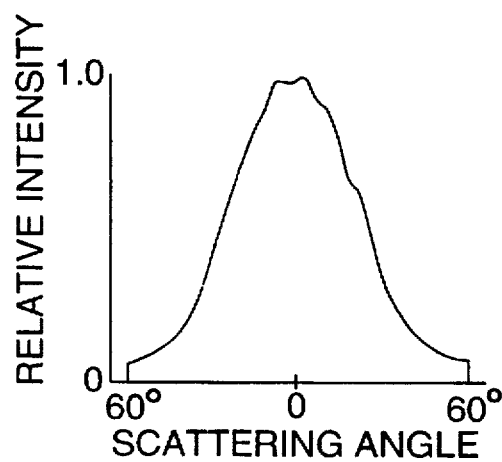
FIG. 8 is a graph of the intensity distribution of light transmitted through the HOE diffuser shown in FIG. 1.

It will be understood that the intensity of the beam after passing through beam-shaping optical element 40 typically decreases smoothly away from its center as shown in FIG. 8 and that the beam may have minor local variations that do not interfere with interpreting the scribe marks. Beams formed by beam-shaping optical element 40 do not carry images of hot spots or other artifacts. The index of refraction of each beam-shaping optical element 40 typically contains micro-variations that form randomly oriented micro-lenses (not shown) across its surface. The micro-lenses precisely shape and homogenize the resultant light beam to produce an output beam of the desired shape. Beam-shaping optical elements that produce variously shaped beams are available. The shape of the beam should approximate that of the string of characters 26 comprising scribe mark 18. Preferred beam-shaping optical elements in the form of HOE diffusers that form an elliptically shaped beam are commercially available under the name "Light Shaping Diffuser™" from Physical Optics Corporation, Torrance, Calif.

Each beam-shaping optical element diffuser 40 shapes light 42 into a beam that provides maximum illumination on the scribe mark 18 area while minimizing illumination of the surrounding area that would produce stray light that can enter camera 56 and obscure the image of scribe mark 18.

Figure 9:
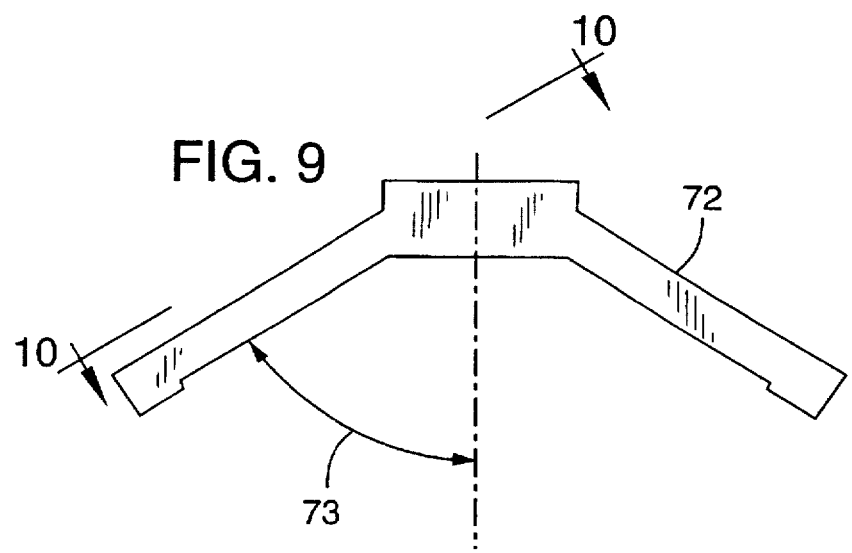
FIG. 9 is an enlarged front elevation view of the bracket shown in FIG. 1 that holds the polarizers.
Figure 10:
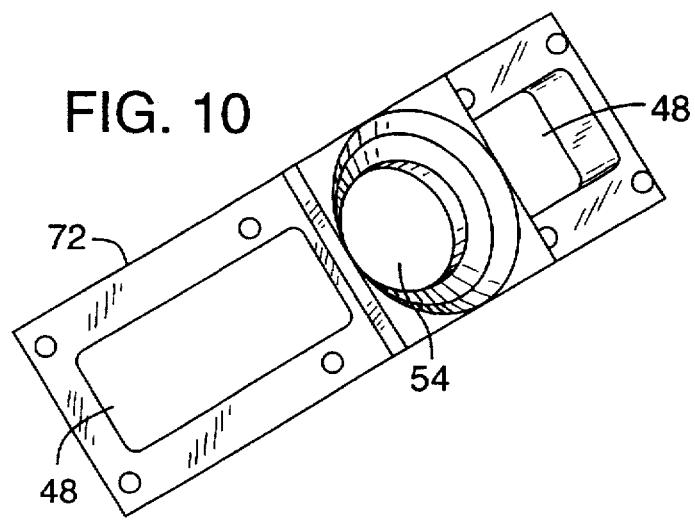
FIG. 10 is an oblique plan view of the bracket of FIG. 9 as seen by looking in the direction of lines 10.

Polarizer 48 is positioned between beam-shaping optical element diffuser 40 and substrate 20. FIGS. 9 and 10 show respective front and oblique plan views of a bracket 72 used to mount polarizers 48 and polarizer 54. Angle 73 is preferably approximately 58°.

Figure 11:
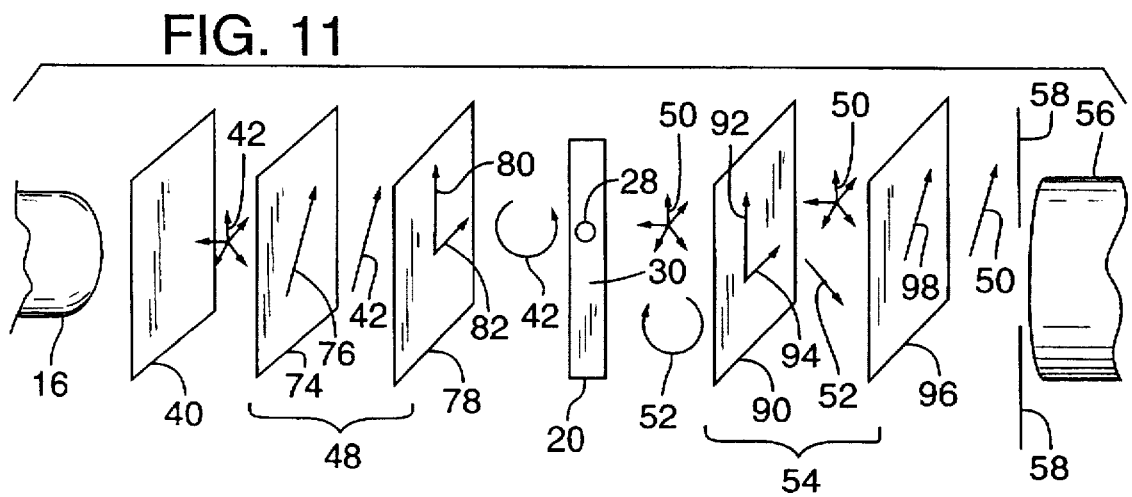
FIG. 11 is a schematic representation of the optical elements of the embodiment of FIG. 1.

FIG. 11 shows that polarizer 48 is preferably of a circularly polarizing type, typically comprising a linear polarizer 74 having a transmission axis 76 and a quarter-wave retarder 78 with mutually perpendicular respective fast and slow axes 80 and 82. Unpolarized light 42 enters linear polarizer 74 and is linearly polarized in the direction of transmission axis 76. Axes 80 and 82 of quarter-wave retarder 78 are oriented at 45° to transmission axis 76 to convert the linearly polarized light to circularly polarized light by phase shifting mutually perpendicular components of the light by 90°. It will be understood that elliptically polarized light can also be used in the invention by substituting a retarder that retards more or less than $\lambda/4$ to phase shift mutually perpendicular components of the light by a phase angle of other than 90°.

Circularly polarized, spatially uniform light 42 illuminates a portion of substrate 20 that includes scribe mark 18. FIGS. 4 and 5 show that scribe mark 18 typically consists of alpha-numeric characters 26 formed by multiple pits 28, each pit consisting of a small depression in substrate 20. Scribe mark 18 could also consist of a bar code or other two-dimensional codes formed by pits 28. Pits 28 are typically made by melting with repeated laser pulses a small area of substrate 20. The melted substrate material is removed during a subsequent processing step to leave a pit-like depression. The illuminated surface areas of substrate 20 around scribe mark 18 include processed areas 30 and pits 28.

Light 42 incident on pit 28 of substrate 20 is scattered as scattered light 50 with predominately random polarization. A significant portion of incident light beam 42 that strikes processed areas 30 is specularly reflected. Specular reflection causes a 180° phase shift that reverses the direction of the circular polarization of reflected light 52 compared to that of incident light 42. (FIG. 11 shows light 42 incident on one side of substrate 20 and light 50 and 52 emerging on the opposite side. It will be understood that such a depiction is for purposes of illustration only and that light is not transmitted through substrate 20.)

Specularly reflected light 52 and scattered light 50 travel to polarizer 54, which is typically a circular polarizer comprising a quarter-wave retarder 90 having mutually orthogonal respective fast and slow axes 92 and 94 a linear polarizer 96 having a transmission axis 98 oriented at 45° to fast and slow axes 92 and 94.

Quarter-wave retarder 90 converts circularly - polarized specularly reflected light 52 into linearly polarized light having a polarization direction perpendicular to transmission axis 98. Reflected light 52 is, therefore, blocked by linear polarizer 96. Scattered light 50, which includes a significant randomly polarized component, remains randomly polarized after passing through quarter-wave retarder 90 and, therefore, passes through linear polarizer 96 to a greater extent than does specularly reflected light 52. Thus, linear polarizer 96 selectively attenuates light reflected from processed area 30, thereby reducing the amount of background light that reaches CCD camera 56.

Polarizer 54 can be the same optical element as polarizer 48 because the desired polarization characteristics are identical. Alternatively, two separate optical elements can be used. Because light 52 reflected by substrate 20 is blocked and light 50 scattered by scribe mark 18 is transmitted to CCD camera 56, the image of the scribe mark 18 appears bright against a dark background. Field stop 58 further reduces the brightness of the dark background. The image of scribe mark 18 is magnified by a lens 100 to more completely fill the field of view of CCD camera 56, thereby facilitating interpretation of the image by optical character recognition software or an observer.

It will be understood that polarizer 54 does not completely block all light from processed areas 30. Plane 66 containing camera 56 and lamp banks 14 is, therefore, canted at slight angle 68 away from plane 69 normal to the top surface of substrate 20 to reduce the amount of reflected and scattered light from processed areas 30 that enters camera 56. As the magnitude of angle 68 is increased, the intensity of light entering camera 56 from processed area 30 is reduced, but so is the intensity of light 50 entering camera 56 from scribe mark 18. An angle 68 of 20° was found to significantly reduce reflected light 52 yet provide sufficient scattered light 50 to camera 56, although the exact angle 68 chosen is not considered to be critical.

Figure 12:
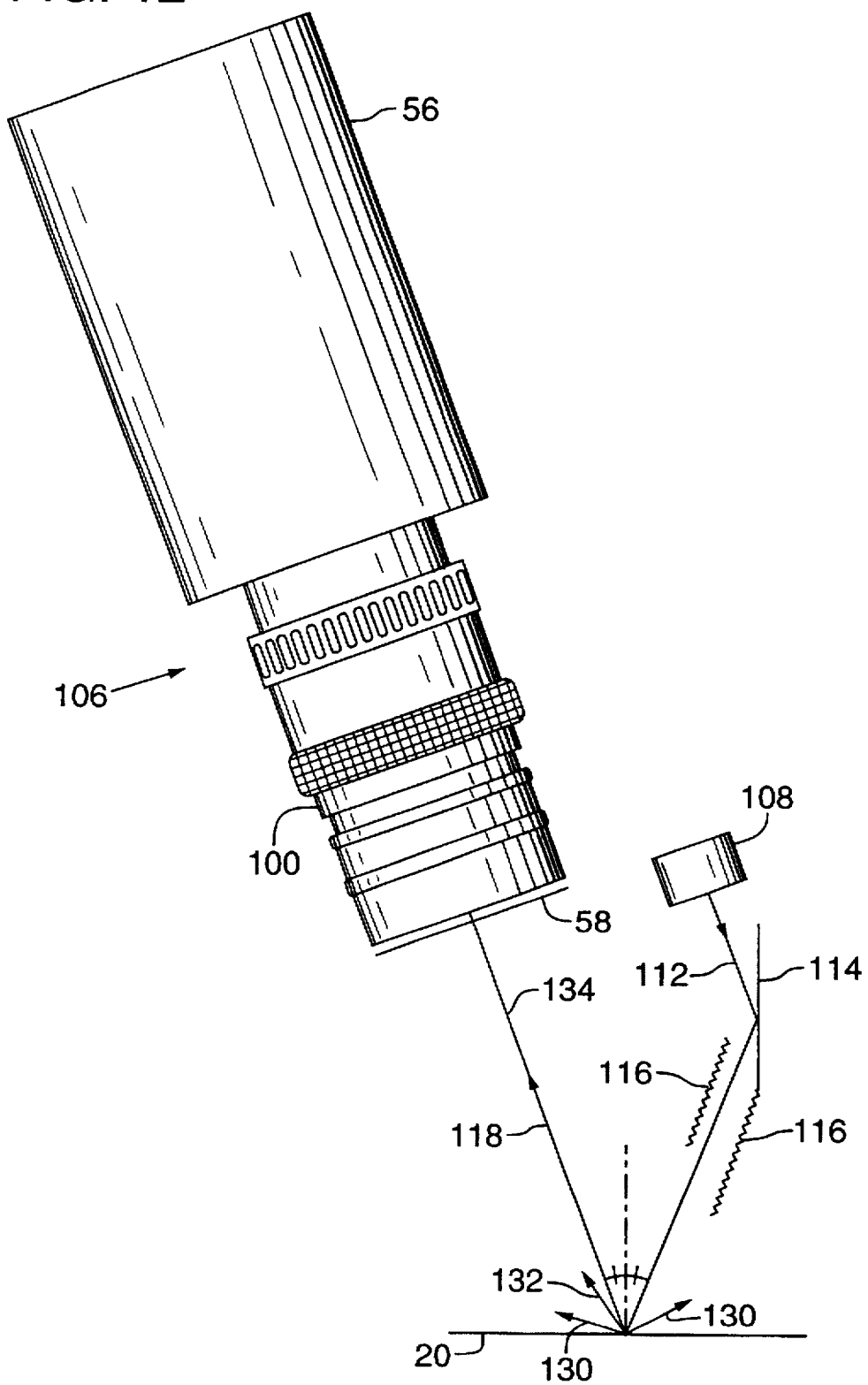
FIG. 12 is a schematic representation of a second preferred embodiment of a scribe mark reader of the present invention.

FIG. 12 shows an alternative preferred embodiment of a scribe mark reader 106 of the invention. A light source 108 comprises an array of LEDs and a diffuser embedded in a matrix. Light 112 propagating from each LED is optically scattered to form an evenly illuminated light emitting surface yielding a near-Lambertian radiation pattern having a luminous intensity of approximately 100 mcd and a dominant wavelength of 637 nm. The geometry of light source 108 is carefully chosen to ensure proper illumination over the field of view of camera 56.

Light 112 is reflected by a HOE reflector 114 that consists of randomly oriented micro-lenses which form light 112 into a precisely shaped beam essentially free of significant local nonuniformities. Light 112 provides spatially uniform illumination in the field of view of camera 56 to provide a high coupling efficiently between light source 108 and camera 56. Baffles 116 pass light that will strike substrate 20 at angles causing specularly reflected light to be reflected into camera 56. Suitable HOE reflectors are commercially available from Physical Optics Corporation, Torrance, California. The purpose of the optical elements between light 108 and camera 56 is to provide a spatially uniform, nearly collimated beam of light to reflect from substrate 20 and into camera 56 sufficient light to form an image while minimizing extraneous light reaching camera 56.

Light 112 incident on processed areas 30 of substrate 20 is specularly reflected as reflected light 118 into camera 56. Light 112 incident on scribe mark 18 is scattered as scattered light 130 throughout a solid angle at a Lambertian distribution. Only the small portion of scattered light 132 that is scattered nearly along the optical axis 134 of camera 56 and within the focusing power of lens 100 enters camera 56. Because the intensity at camera 56 of light 118 reflected from the processed area is so much greater than the intensity of the light scattered from pits 28 of the scribe mark 18, the image formed by camera 56 shows scribe marks 18 as dark areas against a bright background. Lens assembly 100, as in the first embodiment, ensures that the magnified scribe image fills the field of view of camera 56.

It will be obvious that many changes may be made to the above-described details of the invention without departing from the underlying principles thereof. For example, the system could be configured to use either reflective or transmissive HOEs and to operate as a dark field or light field system. The polarization states of the light propagating from substrate 20 can be used to preferentially attenuate light from scribe mark 18 or processed areas 30 without using beam-shaping optical element 40, such as by using a conventional diffuser to reduce nonuniformities in the illumination of the scribe mark. Similarly, beam-shaping optical element 40 can be used without also using the polarization states to selectively attenuate light propagating from substrate. The scope of the present invention should, therefore, be determined only by the following claims.

We claim:

1. A method of forming a machine interpretable static image of a three dimensional scribe mark formed on a specimen by a pattern of depressions in a substrate having nonuniform reflectivity, comprising:

providing a source of light;

forming the light into a beam having a shape related to that of the scribe mark and having a spatial intensity distribution substantially free from significant local nonuniformities;

illuminating with the light beam a field of illumination that includes a portion of the substrate that includes the scribe mark, the field of illumination being substantially stationary in relation to the substrate;

passing through a polarizer light propagating from the substrate to preferentially attenuate light propagating from the scribe mark or light propagating from the substrate around the scribe mark by using the different polarization characteristics of the light propagating from the scribe mark and the light propagating from the substrate around the scribe mark; and forming a machine-interpretable light pattern representative of the scribe mark from light propagating from the substrate by automatically forming a consistently machine-readable image of the scribe mark by automatically adjusting the gain of a light detector so that multiple specimens within a processing lot and in various stages of processing are machine readable without manual adjustment.

2. The method of claim 1 in which the polarizer includes an elliptical polarizer, and further comprising passing through the elliptical polarizer the light propagating from the light source, thereby attenuting light that is not propagating from the scribe mark.

3. The method of claim 1 in which passing through a polarizer the light propagating from the substrate includes attenuating light propagating from the substrate around the scribe mark.

4. The method of claim 3 in which the polarizer is of the circularly polarizing type.

5. The method of claim 4 in which the illuminating a portion of the substrate includes passing light from the source through the circular polarizer and in which the light propagating from the areas of the substrate around the scribe mark is specularly reflected and thereby reversed in handedness, the polarizer attenuating the specularly reflected light and eliminating polarization axes misalignments that reduce the intensity of light entering the detector, thereby allowing the detector to form an interpretable light pattern of the scribe mark.

6. The method of claim 5 in which:

the illuminating a portion of the substrate includes illuminating the portion of the substrate at an angle of incidence that defines a corresponding angle of reflection; and the forming a light pattern includes orienting the light detector to detect light reflected at an angle other than the angle of reflection so that the amount of specularly reflected light entering the light detector is reduced.

7. A method of automatically reading a three dimensional alphanumeric scribe mark on a substrate of a semiconductor wafer, the substrate having non-uniform reflectivity, comprising;

providing a source from which light propagates;

forming the light into a beam having a shape related to that of the scribe mark and having a spatial intensity distribution substantially free from significant local nonuniformities;

illuminating with the light beam a portion of the substrate that includes the scribe mark, the light beam having on the substrate an area of incidence that is stationary during the illumination and causing propagation of light from the scribe mark and from areas of the substrate around the scribe mark;

passing through a polarizer light propagating from the substrate to attenuate the light propagating from the substrate around the scribe mark by using the different polarization characteristics of the light propagating from the scribe mark and of the light propagating from the areas of the substrate around the scribe mark;

forming a machine-readable light pattern representative of the scribe mark from the light propagating from the substrate;

detecting the light pattern using a light detector having an adjustable gain;

automatically adjusting the gain of the light detector to consistently provide machine differentiable contrast between the light pattern of the scribe mark and that of the areas of the substrate around the scribe mark so that multiple wafers within a processing lot and wafers in various stages of processing are automatically machine readable without manual gain adjustment; and interpreting the light pattern formed on the light detector as text.

8. The method of claim 7 in which the polarizer is of the circularly polarizing type and further comprising transmitting through the polarizer light propagating from the light source before the light beam strikes the substrate.

9. A method of automatically interpreting a three dimensional scribe mark formed by depressions on a substrate of a semiconductor wafer, the reflectivity of the substrate and the depressions changing in a non-uniform manner as an incidental result of processing the substrate, the changing reflectivity degrading the contrast between the depressions and surrounding areas of the substrate, the method comprising:

providing a source from which light propagates;

forming the light into a beam having a shape related to that of the scribe mark and having a spatial intensity distribution substantially free from significant local nonuniformities;

illuminating with the light beam a portion of the substrate that includes the scribe mark, the light beam having on the substrate an area of incidence that is stationary during the illumination and causing propagation of light from the scribe mark and from areas of the substrate around the scribe mark;

passing through a polarizer light propagating from the substrate to attenuate the light propagating from the substrate around the scribe mark by using the different polarization characteristics or the light propagating from the scribe mark and of the light propagating from the areas of the substrate around the scribe mark:

forming a machine-readable light pattern representative of the scribe mark from the light propagating from the substrate;

detecting the light pattern using a light detector having an adjustable gain;

automatically adjusting the gain of the light detector to consistently provide machine differentiable contrast between the light pattern of the scribe mark and that of the areas of the substrate around the scribe mark so that multiple wafers within a processing lot and wafers in various stages of processing are automatically machine readable without manual gain adjustment; and interpreting the light pattern formed the light detector as text.

* * * * *